United States Patent
Aoyagi et al.

(10) Patent No.: US 8,620,356 B2
(45) Date of Patent: Dec. 31, 2013

(54) PAGING SIGNAL TRANSMISSION METHOD, RADIO BASE STATION, AND NETWORK DEVICE

(75) Inventors: Kenichiro Aoyagi, Yokosuka (JP);
Masafumi Masuda, Yokosuka (JP);
Hiroyuki Hosono, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 91 days.

(21) Appl. No.: 12/934,501

(22) PCT Filed: Mar. 24, 2009

(86) PCT No.: PCT/JP2009/055856
§ 371 (c)(1),
(2), (4) Date: Dec. 13, 2010

(87) PCT Pub. No.: WO2009/119607
PCT Pub. Date: Oct. 1, 2009

(65) Prior Publication Data
US 2011/0077043 A1  Mar. 31, 2011

(30) Foreign Application Priority Data
Mar. 24, 2008 (JP) ................................ 2008-076674

(51) Int. Cl.
*H04W 68/00* (2009.01)
(52) U.S. Cl.
USPC ......... 455/458; 455/433; 455/435.1; 455/561

(58) Field of Classification Search
USPC ............................... 455/458, 435.1, 433, 561
See application file for complete search history.

(56) References Cited

U.S. PATENT DOCUMENTS

| | | | | |
|---|---|---|---|---|
| 5,924,042 | A * | 7/1999 | Sakamoto et al. | 455/458 |
| 6,219,525 | B1 * | 4/2001 | Imai et al. | 455/3.05 |
| 6,832,093 | B1 * | 12/2004 | Ranta | 455/456.4 |
| 2002/0198025 | A1 * | 12/2002 | Brownlee et al. | 455/561 |
| 2004/0152482 | A1 * | 8/2004 | Raffel et al. | 455/522 |

(Continued)

FOREIGN PATENT DOCUMENTS

| | | |
|---|---|---|
| CN | 101123823 A | 2/2008 |
| JP | 2009-510972 | 3/2009 |
| WO | 2007 040452 | 4/2007 |

OTHER PUBLICATIONS

Office Action issued Sep. 13, 2011, in Japanese Patent Application No. 2008-076674 with English translation.

(Continued)

*Primary Examiner* — Danh Le
(74) *Attorney, Agent, or Firm* — Oblon, Spivak, McClelland, Maier & Neustadt, L.L.P.

(57) ABSTRACT

A paging signal transmission method which transmits the paging signal to a position registration area of a mobile station in response to incoming to the mobile station. When a wireless base station managing a cell belonging to the position registration area of the mobile station does not permit access to the mobile station, the method does not transmits the paging signal to the cell.

8 Claims, 3 Drawing Sheets

(56) References Cited

U.S. PATENT DOCUMENTS

| | | |
|---|---|---|
| 2007/0097938 A1 | 5/2007 | Nylander et al. |
| 2007/0097939 A1 | 5/2007 | Nylander et al. |
| 2007/0097983 A1 | 5/2007 | Nylander et al. |
| 2007/0105527 A1 | 5/2007 | Nylander et al. |
| 2007/0105568 A1 | 5/2007 | Nylander et al. |
| 2007/0183427 A1 | 8/2007 | Nylander et al. |
| 2009/0270111 A1* | 10/2009 | Nakamura et al. ......... 455/456.1 |
| 2010/0285812 A1* | 11/2010 | Murakami ................. 455/452.1 |

OTHER PUBLICATIONS

Chinese Office Action issued Oct. 9, 2012 in Chinese Patent Application No. 200980110227.9 with English translation, 12 pages.

Chinese Office Action issued Jun. 28, 2013 in Chinese Patent Application No. 200980110227.9 with English translation.

* cited by examiner

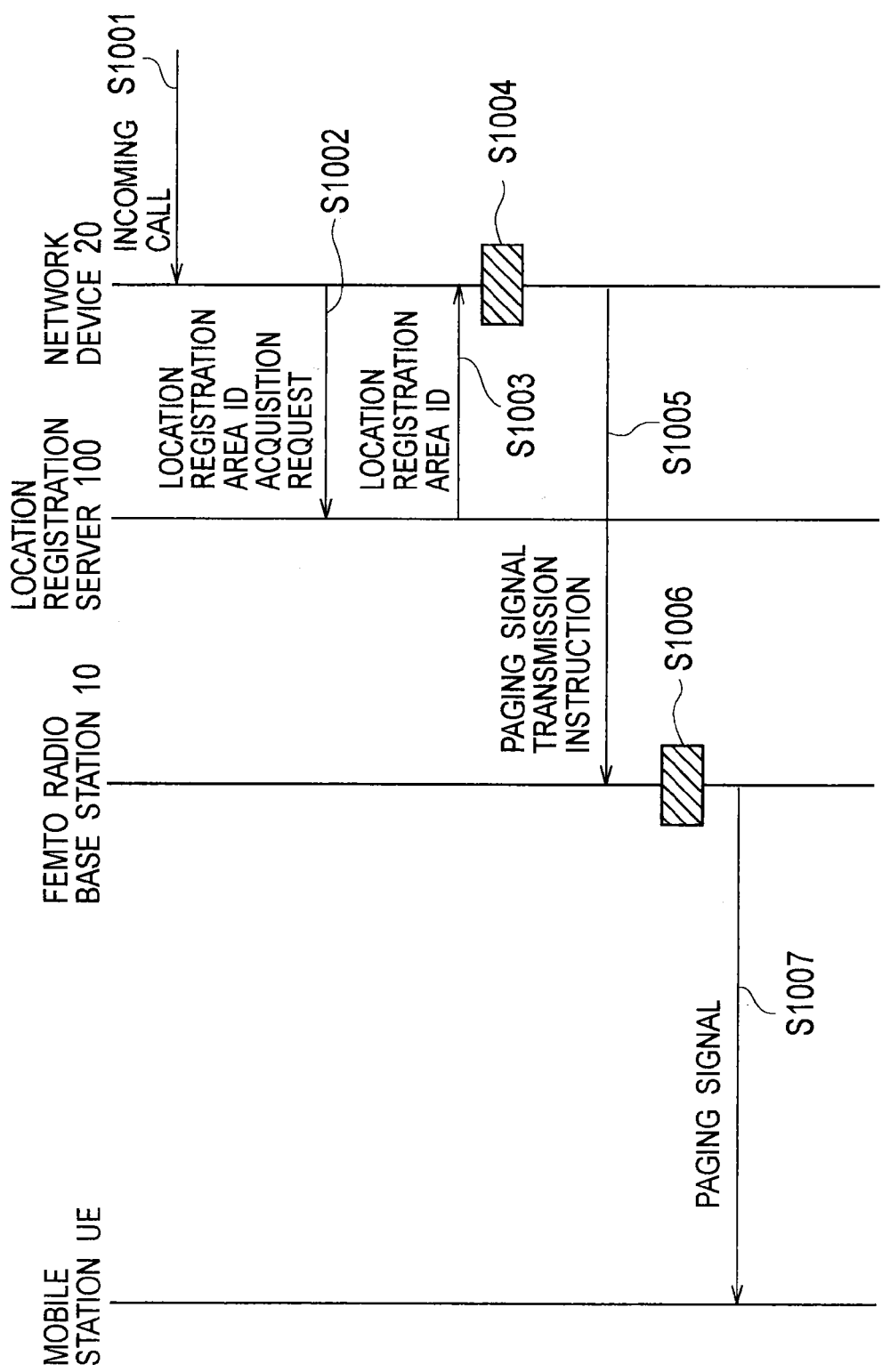

PAGING SIGNAL TRANSMISSION METHOD, RADIO BASE STATION, AND NETWORK DEVICE

TECHNICAL FIELD

The present invention relates to a paging signal transmission method, a radio base station, and a network device for transmitting a paging signal to a location registration area of a mobile station in response to an incoming call addressed to the mobile station.

BACKGROUND ART

In a W-CDMA mobile communication system, a location registration area ID (Location Area ID) is assigned to each of cells.

A mobile station is configured to perform processing of location registration for a location registration server when being turned on or when detecting change in the location registration area ID included in broadcast information transmitted from each cell.

When a call addressed to the mobile station comes in, an exchange inquires the location registration server of a location registration area in which the mobile station exists. Then, a paging signal is transmitted to the location area and thereby the mobile station is notified of the incoming call.

Meanwhile, it is assumed in a conventional mobile communication system that a small radio base station for home use such as a femto radio base station is provided.

For example, when many femto radio base stations are provided in a crowded residential area, an apartment house, or the like, the following problem occurs. When different location registration area IDs are assigned respectively to home cells managed by all the femto radio base stations, the location registration processing is performed frequently by mobile stations.

In order to solve the above problem, an operation is performed in which the same location registration area ID is assigned to a cell group including multiple home cells.

However, the above-described mobile communication system is configured to transmit the paging signal to all the cells which are assigned the same location area ID when a call addressed to the mobile station comes in. Accordingly, the paging signal is transmitted to the home cell which is not accepting access from the mobile station. Thus, there are problems of wasteful consumption of radio resource and wasteful consumption of power in the radio base station due to redundant transmission of the paging signal.

DISCLOSURE OF THE INVENTION

The present invention is made in view of the above problems, and aims to provide a paging signal transmission method, a radio base station, and a network device which are capable of suppressing transmission of a paging signal addressed to a mobile station, to a home cell which is not accepting access from the mobile station, and thereby avoiding wasteful consumption of radio resource and wasteful consumption of power in the radio base station due to redundant transmission of the paging signal.

A first aspect of the present invention is summarized as a paging signal transmission method for transmitting a paging signal to a location registration area of a mobile station in response to an incoming call addressed to the mobile station when a radio base station managing a cell belonging to the location registration area of the mobile station is not accepting access from the mobile station, the paging signal is not transmitted to the cell.

In the first aspect, wherein the radio base station in a sleep state transitions to a startup state when the radio base station is instructed by a network device to transmit the paging signal to the cell and is accepting access from the mobile station and the radio base station in the sleep state remains in the sleep state when the radio base station is instructed by the network device to transmit the paging signal to the cell and is not accepting access from the mobile station.

A second aspect of the present invention is summarized as a paging signal transmission method for transmitting a paging signal to a location registration area of a mobile station in response to an incoming call addressed to the mobile station when a radio base station managing a cell belonging to the location registration area of the mobile station is not accepting access from the mobile station, a network device does not instruct the radio base station to transmit the paging signal to the cell.

In the second aspect, wherein when the radio base station is not accepting access from the mobile station and is instructed by the network device to transmit the paging signal to the cell, the radio base station notifies the network device that the radio base station is not accepting access from the radio base station and the network device stores the fact that the radio base station is not accepting access from the mobile station in response to the notification.

A third aspect of the present invention is summarized as a radio base station used in a mobile communication system in which a paging signal is transmitted to a location registration area of a mobile station in response to an incoming call addressed to the mobile station, the radio base station managing a cell belonging to the location registration area of the mobile station wherein the radio base station is configured not to transmit the paging signal to the cell when the radio base station is not accepting access from the mobile station.

In the third aspect, wherein the radio base station is configured to notify a network device that the radio base station is not accepting the access from the mobile station when the radio base station is not accepting access from the mobile station and is instructed from the network device to transmit the paging signal to the cell.

In the third aspect, wherein the radio base station is configured to transition to a startup state when the radio base station in a sleep state is instructed by a network device to transmit the paging signal to the cell and is accepting access from the mobile station and the radio base station is configured to remain in the sleep state when the radio base station in the sleep state is instructed by the network device to transmit the paging signal to the cell and is not accepting access from the mobile station.

A fourth aspect of the present invention is summarized as a network device used in a mobile communication system in which a paging signal is transmitted to a location registration area of a mobile station in response to an incoming call addressed to the mobile station when a radio base station managing a cell belonging to the location registration area of the mobile station is not accepting access from the mobile station, the network device does not instruct the radio base station to transmit the paging signal to the cell.

In the fourth aspect, wherein the network device receives a notification from the radio base station, the notification indicating that the radio base station is not accepting access from the mobile station and the network device stores the fact that the radio base station is not accepting access from the mobile station in response to the notification.

BRIEF DESCRIPTION OF THE DRAWINGS

FIG. 4 is a sequence diagram showing an operation of the mobile communication system according to the first embodiment of the present invention.

BEST MODES FOR CARRYING OUT THE INVENTION

Figure 1:
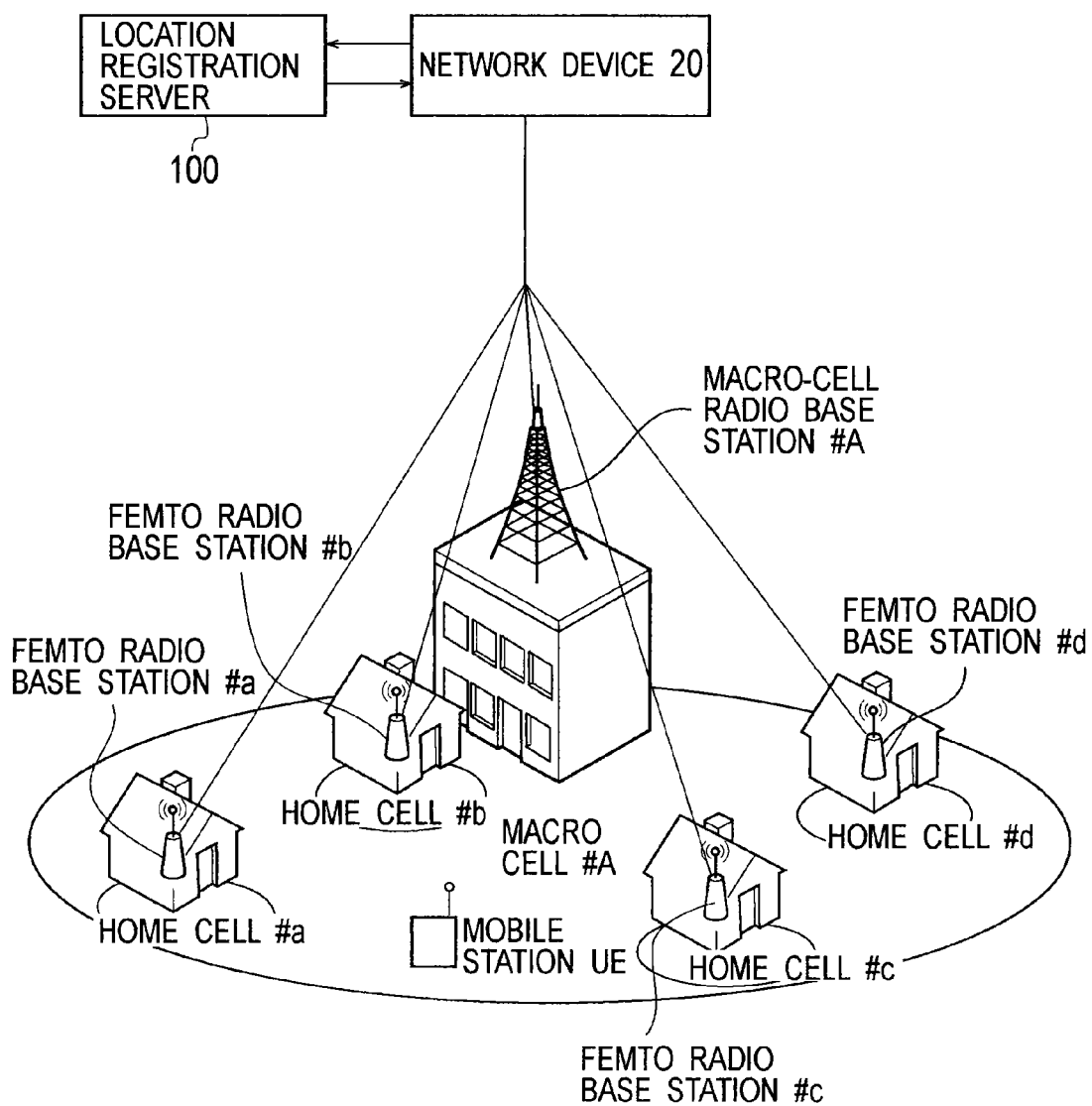
FIG. 1 is an overall configuration diagram of a mobile communication system according to a first embodiment of the present invention.
Figure 2:
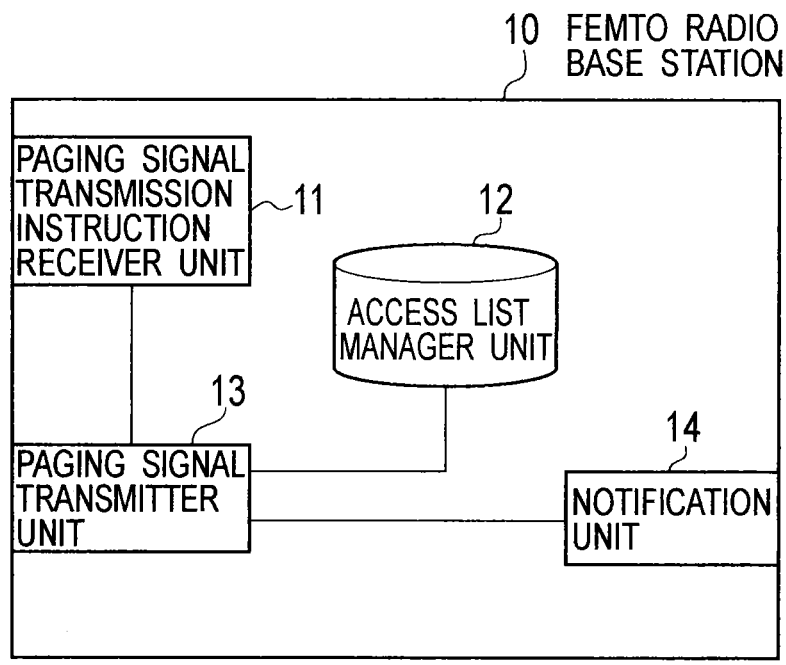
FIG. 2 is a functional block diagram of a femto radio base station according to the first embodiment of the preset invention.
Figure 3:
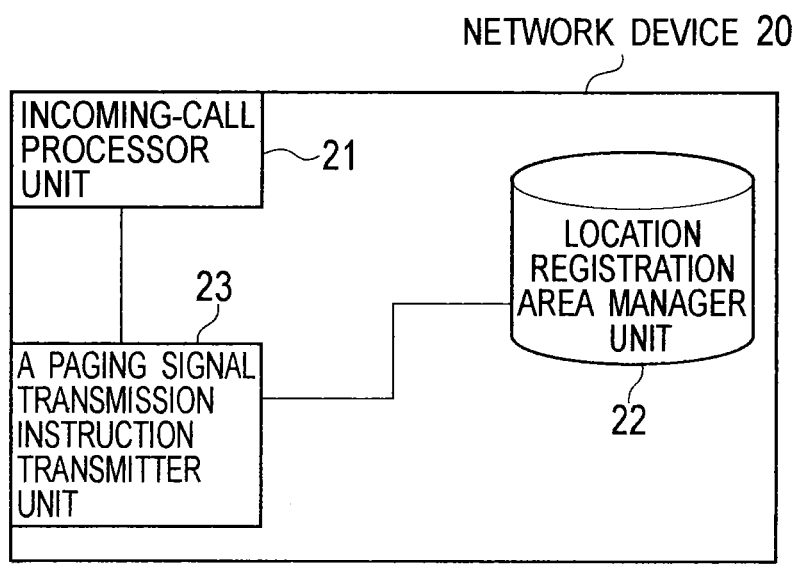
FIG. 3 is a functional block diagram of a network device according to the first embodiment of the present invention.

Configuration of Mobile Communication System according to First Embodiment of Present Invention With reference to FIGS. 1 to 3, a description is given of a configuration of a mobile communication system according to a first embodiment of the present invention.

As shown in FIG. 1, the mobile communication system according to this embodiment includes a location registration server 100, a network device 20, a macro-cell radio base station #A which manages a macro cell #A, a femto radio base station #a which manages a home cell #a, a femto radio base station #b which manages a home cell #b, a femto radio base station #c which manages a home cell #c, and a femto radio base station #d which manages a home cell #d.

The location registration server 100 is configured to manage a location registration area in which a mobile station UE exists.

In this embodiment, the same location registration area ID (Location Area ID) #1 is assumed to be assigned to the macro cell #A, the home cell #a, the home cell #b, the home cell #c, and the home cell #d.

In addition, in this embodiment, the mobile station UE is assumed to be within a location registration area identified by the location registration area ID #1.

As shown in FIG. 2, a femto radio base station 10 according to this embodiment includes a paging signal transmission instruction receiver 11, an access list manager 12, a paging signal transmitter 13, and a notification unit 14.

Note that, in this embodiment, the femto radio base stations #a to #d basically have the same functions. Thus, the functions of the femto radio base stations #a to #d are described as functions of the above-described femto radio base station 10.

The paging signal transmission instruction receiver 11 is configured to receive a paging signal transmission instruction from the network device 10 such as an exchange MSC/SGSN or a radio network controller RNC. In the paging signal transmission instruction, the femto radio base station 10 is instructed to transmit a paging signal addressed to the mobile station UE, to a cell to which the location registration area ID #1 is assigned.

The access list manager 12 is configured to manage an access list in which mobile stations UE accessible to the femto radio base station 10 (or a home cell #10 managed by the femto radio base station 10) are set.

The paging signal transmitter 13 is configured to transmit the paging signal addressed to a mobile station UE, to a specific cell in accordance with the paging signal transmission instruction received by the paging signal transmission instruction receiver 11.

Here, when the femto radio base station 10 is not accepting access from the mobile station UE, the paging signal transmitter 13 is configured not to transmit the paging signal to the cell (home cell #10) even if the paging signal transmission instruction receiver 11 receives the above-described paging signal transmission instruction.

Note that, the femto radio base station 10 in a sleep state may transition to a startup state when the femto radio base station 10 is instructed by the network device to transmit the paging signal addressed to the mobile station UE, to a cell included in the location registration area of the mobile station UE, and is accepting access from the mobile station UE. Thereafter, the paging signal transmitter 13 transmits the paging signal.

On the other hand, the femto radio base station 10 in the sleep state may remain in the sleep state when the femto radio base station 10 is instructed by the network device to transmit the paging signal addressed to the mobile station UE, to a cell included in the location registration area of the mobile station UE, and is not accepting access from the mobile station UE. Here, the paging signal transmitter 13 does not transmit the paging signal.

The notification unit 14 is configured to notify the network device that access from the mobile station UE is not accepted, when the femto radio base station 10 is not accepting access from the mobile station UE and is instructed from the network device to transmit the paging signal to the home cell #10.

As shown in FIG. 3, the network device 10 includes an incoming-call processor 21, a location registration area manager 22, and a paging signal transmission instruction transmitter 23.

Note that the functions of the network device 10 may be installed in a single device such as an exchange MSC/SGSN or a radio network controller RNC, or may be installed in multiple devices such as an exchange MSC/SGSN and a radio network controller RNC.

The incoming-call processor 21 is configured to detect an incoming call addressed to a mobile station UE in a cell managed by a radio base station (including the macro-cell radio base station #A and the femto radio base stations #a to #d) under control of the network device 10. Then, the incoming-call processor 21 notifies the paging signal transmission instruction transmitter 23 of the incoming-call.

The location registration area manager 22 is configured to mange a location registration area in which the mobile station UE exists. Specifically, the location registration area manager 22 is configured to manage a location registration area in which the mobile station UE exists, the location registration area received from the location registration server 100.

The paging signal transmission instruction transmitter 23 is configured to transmit the paging signal transmission instruction to the radio base station in response to the incoming call addressed to the mobile station UE, the radio base station managing the location registration area of the mobile station UE. In the paging signal transmission instruction, the radio base station is instructed to transmit the paging signal to the location registration area of the mobile station UE (specifically, to the cell included in the location registration area of the mobile station UE).

Here, the paging signal transmission instruction transmitter 23 may be configured not to instruct the femto radio base station which is not accepting the access from the mobile station UE to transmit the paging signal transmission instruction to the above-described cell, that is, not to transmit the above-described paging signal to the femto radio base station.

Here, the femto radio base station is among the radio base stations which manage the location registration area of the mobile station UE.

The paging signal transmission instruction transmitter 23 may be configured to receive notification from the femto radio base station, indicating that the femto radio base station is not accepting access from the mobile station UE, and store the fact that the femto radio base station is not accepting access from the mobile station UE in response to the notification.

Note that the paging signal transmission instruction transmitter 23 is configured to manage the location registration area ID assigned to each of the cells managed by the radio base stations under control of the network device 10.

The paging signal transmission instruction transmitter 23 may be configured to change the location registration area ID assigned to a home cell managed by a femto radio base station when receiving the notification from the femto radio base station indicating that the femto radio base station is not accepting the access from the mobile station UE.

Operation of Mobile Communication System According to First Embodiment of Present Invention With reference to FIG. 4, a description is given of an operation of the mobile communication system according to the first embodiment of the present invention.

As shown in FIG. 4, in step S1001, the network device 10 (exchange MSC/SGSN) receives the incoming call addressed to the mobile station UE.

In step S1002, the network device 10 transmits a location registration area ID acquisition request to the location registration server 100, the location registration area ID acquisition request used for acquiring the location registration area ID identifying the location registration area in which the mobile station UE exists. In step S1003, the network device 10 acquires the location registration area ID.

In step S1004, the network device 10 extracts the femto radio base station which is not accepting access from the mobile station UE, from among the radio base stations (macro-cell radio base station and femto radio base stations) managing the cells (macro cell and home cell) to which the location registration area ID is assigned.

In step S1005, the network device 10 transmits the paging signal transmission instruction to the radio base stations (macro-cell radio base station and femto radio base stations 10) other than the femto radio base station which is not accepting access from the mobile station UE. In the paging signal transmission instruction, the radio base station is instructed to transmit the paging signal addressed to the mobile station UE, to the cells to which the location registration area ID is assigned.

In step S1006, the femto radio base station 10 determines whether or not access from the mobile station UE is accepted.

When determining that access from the mobile station UE is accepted, in step S1007, the femto radio base station 10 transmits the paging signal addressed to the mobile station UE, to the home cell #10 under its control.

On the other hand, when determining that access from the mobile station UE is not accepted, the femto radio base station 10 does not transmit the paging signal addressed to the mobile station UE, to the home cell #10 under its control, and notifies the network device 10 of the fact.

Then, in response to the notification, the network device 10 stores the fact that the femto radio base station 10 is not accepting access from the mobile station UE (or changes the location registration area ID #1 currently assigned to the home cell #10 under control of the femto radio base station 10 to a different location registration area ID). Thereafter, the network device 10 does not transmit the paging signal transmission instruction to the femto radio base station 10 even when detecting the incoming-call addressed to the mobile station UE.

Advantageous Effects of Mobile Communication System According to First Embodiment of Present Invention The mobile communication system according to the first embodiment of the present invention suppresses the transmission of the paging signal addressed to the mobile station, to the home cell which is not accepting access from the mobile station UE. This prevents wasteful consumption of radio resource and wasteful consumption of power in the radio base station due to redundant transmission of the paging signal.

In addition, according to the mobile communication system of the first embodiment of the present invention, the network device can change the location area ID assigned to the home cell #10 under control of the femto radio base station 10 which is not accepting access from the mobile station UE. Accordingly, the location registration area ID assigned in advance to cells in a group basis can be automatically changed every time the paging signal is received.

Assume a case where, for example, apartment buildings in which many home cells are formed are located adjacent to each other and the home cells are assigned the same location registration area ID in advance. In such case, the mobile communication system can be provided with a function in which the location registration area ID can be changed automatically and uniformly for the home cells in any one of the apartment buildings by accumulating information that the paging signal is not transmitted in certain home cells. Thus, the mobile communication system can be expected to be effective in reduction of a task for managing the location registration area IDs.

Modified Example

Although the above embodiment is described by taking a W-CDMA type mobile communication system as an example, the present invention is not limited to this mobile communication system, and is also applicable to an LTE (Long Term Evolution) type mobile communication system, for example.

In the LTE type mobile communication system, an exchange MME is configured to serve as the above network device.

Moreover, the exchange MME is configured to identify each of cells (macro cell and home cells) by using "Tracking Area ID."

In addition, the present invention is also applicable to a case where the home cell and the macro cell are managed by separate location registration servers. Effects similar to the above-described embodiments can be expected in a case where reduction of a task for managing the location registration area IDs is achieved by setting the same location registration area ID to several home cells.

Note that operation of the above described mobile station UE, the radio base stations (macro-cell radio base station and femto radio base station units), the radio network controller RNC and the exchange MSC/SGSN may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE, the radio base stations (macro-cell radio base station and femto radio base station units), the radio network controller RNC and the exchange MSC/SGSN. Also, the storage medium and the processor may be provided in mobile station UE, the radio base stations (macro-cell radio base station and femto radio base station units), the radio network controller RNC and the exchange MSC/SGSN as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

INDUSTRIAL APPLICABILITY

As described above, the present invention can provide a paging signal transmission method, a radio base station, and a network device which are capable of suppressing transmission of a paging signal addressed to a mobile station, to a home cell which is not accepting access from the mobile station, and thereby avoiding wasteful consumption of radio resource and wasteful consumption of power in the radio base station due to redundant transmission of the paging signal.

The invention claimed is:

1. A paging signal transmission method comprising:
receiving an incoming call addressed to a mobile station; and
restricting transmission of an initial paging signal from a femto radio base station managing a cell belonging to a location registration area of the mobile station based on the incoming call addressed to the mobile station, when the femto base station has a same location registration area identification that is assigned to a macro-cell radio base station and the femto radio base station is not accepting access from the mobile station.

2. The paging signal transmission method according to claim 1, wherein
the femto radio base station in a sleep state transitions to a startup state when the femto radio base station is instructed by the network device to transmit the paging signal to the cell and is accepting access from the mobile station, and
the femto radio base station in the sleep state remains in the sleep state when the femto radio base station is instructed by the network device to transmit the paging signal to the cell and is not accepting access from the mobile station.

3. The paging signal transmission method according to claim 1, wherein
when the femto radio base station is not accepting access from the mobile station and is instructed by the network device to transmit the paging signal to the cell, the femto radio base station notifies the network device that the femto radio base station is not accepting access from the femto radio base station, and
the network device stores the fact that the femto radio base station is not accepting access from the mobile station in response to the notification.

4. A femto radio base station used in a mobile communication system and that manages a cell belonging to a location registration area of a mobile station, the femto radio base station comprising:
an interface that receives a paging signal in response to an incoming call addressed to the mobile station; and
a processor that restricts the femto radio base station from transmitting an initial paging signal based on the received paging signal to the cell when the femto base station has a same location registration area identification that is assigned to a macro-cell radio base station and the femto radio base station is not accepting access from the mobile station.

5. The femto radio base station according to claim 4, wherein
the interface notifies a network device that the femto radio base station is not accepting the access from the mobile station when the femto radio base station is not accepting access from the mobile station and is instructed from the network device to transmit the paging signal to the cell.

6. The femto radio base station according to claim 4, wherein
the femto radio base station is configured to transition to a startup state when the femto radio base station in a sleep state is instructed by a network device to transmit the paging signal to the cell and is accepting access from the mobile station, and
the femto radio base station is configured to remain in the sleep state when the femto radio base station in the sleep state is instructed by the network device to transmit the paging signal to the cell and is not accepting access from the mobile station.

7. A network device used in a mobile communication system in which a paging signal is transmitted to a location registration area of a mobile station in response to an incoming call addressed to the mobile station, the network device comprising:
an interface that receives the incoming call addressed to the mobile station; and
a processor that restricts a femto radio base station managing a cell belonging to the location registration area of the mobile station from transmitting an initial paging signal based on the incoming call addressed to the mobile station when the femto base station has a same location registration area identification that is assigned to a macro-cell radio base station and the femto radio base station is not accepting access from the mobile station.

8. The network device according to claim 7, wherein
the network device receives a notification from the femto radio base station, the notification indicating that the femto radio base station is not accepting access from the mobile station, and
the network device stores the fact that the femto radio base station is not accepting access from the mobile station in response to the notification.

* * * * *